(12) United States Patent
Wankhede et al.

(10) Patent No.: US 9,327,592 B2
(45) Date of Patent: May 3, 2016

(54) BUMPER WITH INTEGRATED AUXILLIARY COOLER

(71) Applicant: GM GLOBAL TECHNOLOGY OPERATIONS LLC, Detroit, MI (US)

(72) Inventors: Mukund S. Wankhede, Fort Gratiot, MI (US); Stuart J. Brown, Flint, MI (US); Christopher C. Nyeholt, Armada, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 64 days.

(21) Appl. No.: 14/220,206

(22) Filed: Mar. 20, 2014

(65) Prior Publication Data

US 2015/0266371 A1    Sep. 24, 2015

(51) Int. Cl.
*B60R 19/48* (2006.01)
*B60K 11/04* (2006.01)
*B60R 19/02* (2006.01)

(52) U.S. Cl.
CPC ............... *B60K 11/04* (2013.01); *B60R 19/023* (2013.01); *B60R 19/48* (2013.01); *B60R 2019/486* (2013.01)

(58) Field of Classification Search
CPC ...................................................... B60R 19/48
USPC ....................................................... 293/117
See application file for complete search history.

(56) References Cited

U.S. PATENT DOCUMENTS

| | | | | |
|---|---|---|---|---|
| 4,902,059 A * | 2/1990 | Tritton | ......................... | 293/117 |
| 5,460,420 A * | 10/1995 | Perkins et al. | ................ | 293/106 |
| 6,485,072 B1 * | 11/2002 | Werner et al. | ................. | 293/132 |
| 6,945,576 B1 * | 9/2005 | Arentzen | ...................... | 293/117 |
| 7,484,780 B2 * | 2/2009 | Naick et al. | ................. | 293/120 |
| 7,503,601 B2 * | 3/2009 | Agrahari | ...................... | 293/102 |
| 7,537,252 B2 * | 5/2009 | Nagai et al. | .................... | 293/102 |
| 8,016,331 B2 * | 9/2011 | Ralston et al. | ................ | 293/120 |
| 8,099,969 B2 * | 1/2012 | Henning et al. | ................ | 62/109 |
| 8,157,066 B2 * | 4/2012 | Murayama et al. | ........... | 188/371 |
| 8,668,234 B2 * | 3/2014 | Yamaguchi et al. | .......... | 293/120 |
| 8,820,453 B2 * | 9/2014 | Giles-Brown et al. | ....... | 180/68.4 |

FOREIGN PATENT DOCUMENTS

| | | | |
|---|---|---|---|
| CN | 204055227 U | * | 12/2014 |
| DE | 102010014077 A1 | * | 10/2011 |
| DE | 102013206785 A1 | * | 10/2014 |
| ES | 2378618 A1 | * | 4/2012 |
| JP | 2010018151 A | * | 1/2010 |
| JP | 2012171405 A | * | 9/2012 |
| JP | 2012254752 A | * | 12/2012 |

* cited by examiner

*Primary Examiner* — Hilary Gutman
(74) *Attorney, Agent, or Firm* — Quinn Law Group, PLLC

(57) ABSTRACT

A vehicle includes a body that extends along a longitudinal axis, between a forward end and a rearward end. A front bumper assembly is disposed at the forward end of the body. The front bumper assembly includes a B-shaped structure that defines a channel that extends transversely across the body, relative to the longitudinal axis. A heat exchanger is disposed within the channel of the bumper structure. The heat exchanger is operable to transfer heat from a fluid circulating through the heat exchanger to a flow of air passing across the heat exchanger. The fluid may include, but is not limited to, engine oil, transmission fluid, power steering fluid, or an engine coolant from a low temperature coolant loop.

18 Claims, 2 Drawing Sheets

BUMPER WITH INTEGRATED AUXILLIARY COOLER

TECHNICAL FIELD

The invention generally relates to a vehicle, and more specifically to a front bumper of the vehicle that includes an integrated auxiliary cooler, i.e., heat exchanger.

BACKGROUND

Vehicles typically include a Condenser Radiator Fan Module (CRFM) disposed at a forward end of the body for cooling various fluids. The CRFM is a combination of several different, generally planar, heat exchangers, which are packaged together in a vertical spaced relationship relative to each other. For example, the CRFM may include a first heat exchanger, e.g., a radiator, for cooling an engine coolant, a second heat exchanger, e.g., a charge air cooler, for cooling combustion air, a third heat exchanger, e.g., a condenser, for cooling a refrigerant of an air conditioning system, and a fourth heat exchanger, e.g., an auxiliary cooler, for cooling some other vehicle fluid, such as but not limited to engine oil, transmission fluid, power steering fluid, or an engine coolant from a low temperature coolant loop. When combined together, the packaging of all of these different heat exchangers requires a significant stack length, i.e., a significant distance measured along a longitudinal axis of the vehicle.

SUMMARY

A vehicle is provided. The vehicle includes a body that extends along a longitudinal axis, between a forward end and a rearward end. A bumper is disposed at the forward end of the body. The bumper defines a channel that extends transversely across the body, relative to the longitudinal axis. A heat exchanger is disposed within the channel of the bumper. The heat exchanger is operable to transfer heat from a fluid circulating through the heat exchanger to a flow of air passing across the heat exchanger.

A front bumper assembly for a vehicle is also provided. The front bumper assembly includes a structure extending along a structure axis. The structure includes an upper box portion vertically spaced from and above a lower box portion, and a wall portion extending vertically between the upper box portion and the lower box portion. The upper box portion, the lower box portion, and the wall portion cooperate to define a channel therebetween. The channel extends along the structure axis. A heat exchanger is supported by the structure, and disposed within the channel of the structure. The heat exchanger is operable to transfer heat from a fluid circulating through the heat exchanger to a flow of air passing across the heat exchanger.

Accordingly, positioning the auxiliary heat exchanger in the channel of the bumper, removes the auxiliary heat exchanger from a Condenser Radiator Fan Module (CRFM) of the vehicle. By removing the auxiliary heat exchanger from the CRFM, a stack length of the CRFM, measured along a longitudinal axis of the vehicle, is reduced, which provides a smaller front overhang, and may reduce the mass of the vehicle, and allow for increased styling variations. The auxiliary heat exchanger may be used to cool a fluid of the vehicle, such as but not limited to, engine oil, transmission fluid, power steering fluid, or an engine coolant from a low temperature coolant loop.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Figure 1:
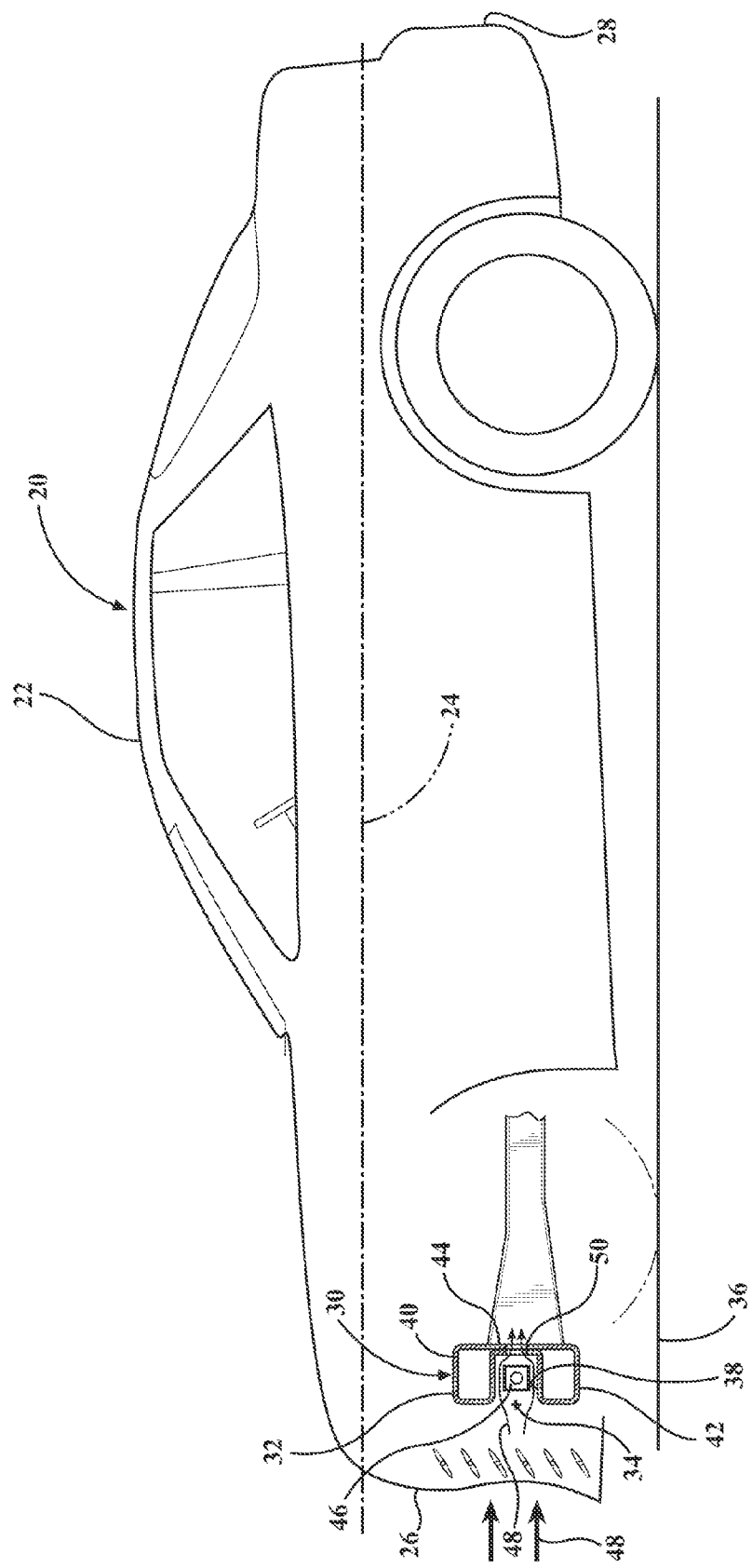
FIG. 1 is a schematic cross sectional view of a vehicle.

Referring to the Figures, wherein like numerals indicate like parts throughout the several views, a vehicle is generally shown at 20 in FIG. 1. Referring to FIG. 1, the vehicle 20 includes a body 22 that extends along a longitudinal axis 24 between a forward end 26 and a rearward end 28. The forward end 26 may be described as the front of the vehicle 20, and the rearward end 28 may be described as the rear of the vehicle 20.

Figure 2:
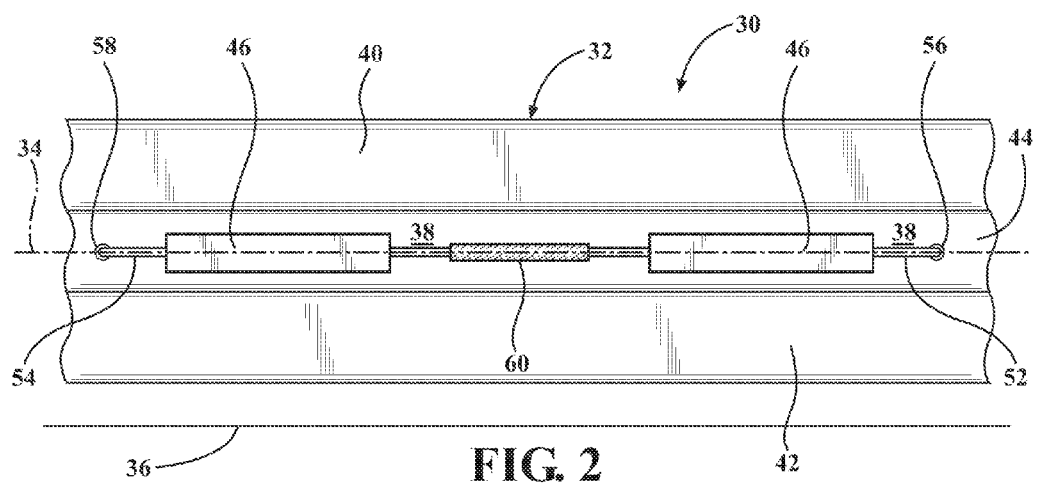
FIG. 2 is a schematic plan view of a bumper assembly of the vehicle, viewed from a frontal direction.

Referring to FIGS. 1 and 2, a front bumper assembly 30 is attached to the body 22 at the forward end 26 thereof. The front bumper assembly 30 includes a structure 32 that extends along a structure axis 34, best shown in FIG. 2. The structure axis 34 is approximately perpendicular to the longitudinal axis 24, and is parallel with a horizontal plane 36. The structure 32 of the bumper assembly 30 provides the structural support and rigidity of the bumper assembly 30. The structure 32 defines a channel 38 that extends along the structure axis 34, transversely across the body 22 relative to the longitudinal axis 24.

The structure 32 of the bumper assembly 30 includes an upper box portion 40, a lower box portion 42, and a wall portion 44. The upper box portion 40 is vertically spaced from and above the lower box portion 42. The wall portion 44 extends vertically between the upper box portion 40 and the lower box portion 42. The upper box portion 40, the lower box portion 42, and the wall portion 44 cooperate together to define the channel 38 therebetween. The channel 38 is open toward the forward end 26 of the body 22, with the wall portion 44 disposed nearer the rearward end 28 of the body 22. The structure 32 may be manufactured and/or assembled in any suitable manner, from any suitable material, capable of providing the required structural stiffness for the bumper assembly 30. For example, the structure 32 of the bumper assembly 30 may be manufactured from a sheet of metal bent to form both the upper box portion 40 and the lower box portion 42, with longitudinal edges of the sheet welded to the sheet at the wall portion 44.

A heat exchanger 46 is disposed within the channel 38 of the bumper assembly 30. The heat exchanger 46 is operable to transfer heat from a fluid circulating through the heat exchanger 46 to a flow of air 48 passing across the heat exchanger 46. The fluid may include, but is not limited to, engine oil, transmission fluid, power steering fluid, or an engine coolant from a low temperature coolant loop. The heat exchanger 46 may be referred to as an auxiliary cooler.

The wall portion 44 of the bumper is disposed rearward of the heat exchanger 46, and defines at least one aperture 50 to allow the flow of air 48 through the channel 38. Preferably, the aperture 50 includes a plurality of apertures 50 that are disposed directly rearward of the heat exchanger 46. The apertures 50 may include any number thereof, and may include any desirable shape and/or size to provide the necessary airflow across the heat exchanger 46 for cooling the fluid. For example, the apertures 50 may include a circular shape, rectangular shape, or an oval shape.

The heat exchanger 46 may include any suitable design and/or configuration capable of being positioned within the channel 38 of the bumper assembly 30. For example, the heat exchanger 46 may include an elongated tubular shape, having a plurality of cooling fins extending radially outward therefrom. The heat exchanger 46 defines a cross sectional shape perpendicular to a central axis of the heat exchanger 46. Preferably, the cross sectional shape of the heat exchanger 46 includes one of a rounded cross sectional shape such as a circle or an oval, or a polygonal cross sectional shape such as a square or a rectangle. Additionally, the heat exchanger 46 may include two or more heat exchangers 46 arranged in series with each other, such as shown in FIG. 2.

The vehicle 20 includes an inlet fluid line 52 and an outlet fluid line 54. The inlet fluid line 52 is disposed in fluid communication with the heat exchanger 46, and circulates the fluid to the heat exchanger 46. The outlet fluid line 54 is disposed in fluid communication with the heat exchanger 46, and circulates the fluid away from the heat exchanger 46.

The wall portion 44 of the bumper may define a first port 56 for routing the inlet fluid line 52 therethrough. Accordingly, the inlet fluid line 52 passes through the first port 56 in order to connect to an inlet end of the heat exchanger 46. The wall portion 44 of the bumper may define a second port 58 for routing the outlet fluid line 54 therethrough. Accordingly, the outlet fluid line 54 passes through the second port 58 in order to connect to an outlet end of the heat exchanger 46.

The vehicle 20 may include at least one flexible line 60 attached to the heat exchanger 46, for attenuating vibration in the heat exchanger 46 from the inlet fluid line 52 and/or the outlet fluid line 54. For example, a first flexible line 60 may connect the heat exchanger 46 and the inlet fluid line 52, and a second flexible line 60 may connect the heat exchanger 46 and the outlet fluid line 54. Alternatively, as shown in FIG. 2, if the heat exchanger 46 includes multiple heat exchangers 46 arranged in series, then the flexible line 60 may connect two adjacent pair of heat exchangers 46.

While the exemplary embodiment of the front bumper assembly 30 is shown in the Figures and described herein as including only a single fluid cooling circuit for cooling only a single fluid, it should be appreciated that the front bumper assembly 30 may include multiple fluid cooling circuits, with each of the different fluid cooling circuits configured for cooling different fluids. Each of the different fluid cooling circuits would include separate heat exchangers 46, and their own respective inlet fluid lines 52 and outlet fluid lines 54. The different fluid cooling circuits may be arranged in any suitable manner, such as vertically one above the other, or horizontally next to each other, in an end to end arrangement.

Figure 3:
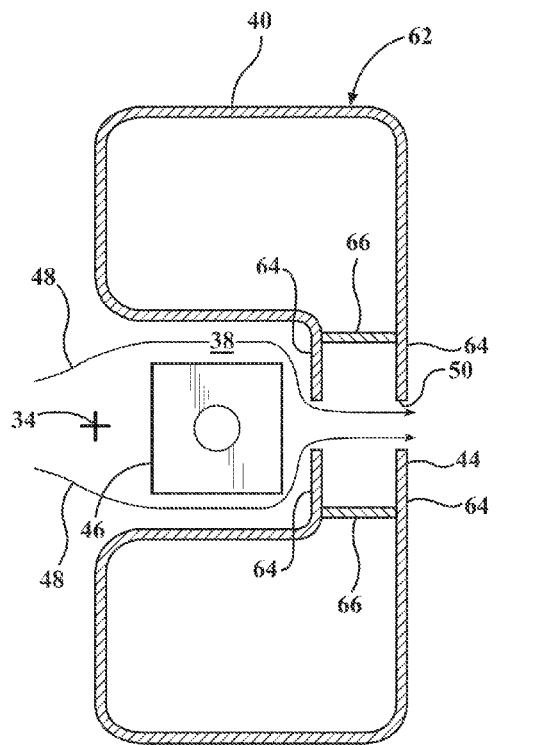
FIG. 3 is a schematic cross sectional view of a first alternative embodiment of the bumper assembly.
Figure 4:
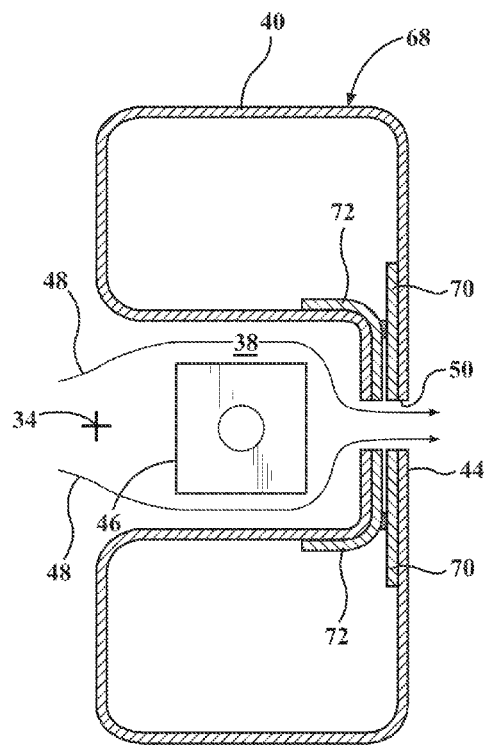
FIG. 4 is a schematic cross sectional view of a second alternative embodiment of the bumper assembly.

In order for the structure 32 of the bumper assembly 30 to provide the required structural stiffness, the structure 32 may include one or more reinforcing members. The reinforcing members may be positioned at, or attached to either the wall portion 44, the upper box portion 40, and/or the lower box portion 42. Referring to FIG. 3, a first alternative embodiment of the structure is shown at 62. The wall portion 44 of the structure 62 is shown having parallel walls 64 spaced apart from each other, with a first reinforcing member 66 extending along the structure 62, parallel with the structure axis 34, between the spaced apart parallel walls 64. Referring to FIG. 4, a second alternative embodiment of the structure is shown at 68. The structure 68 includes a second reinforcing member 70 and a third reinforcing member 72 attached to the wall portion 44, and at least partially extending into the upper box portion 40 and the lower box portion 42.

While exemplary embodiments of the structure 32, 62, 68 are shown in FIGS. 1, 3 and 4 respectively, it should be appreciated that the structure may be configured and/or shaped in some other shape suitable to provide the required structural stiffness of the bumper assembly 30.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle comprising:
   a body extending along a longitudinal axis between a forward end and a rearward end;
   a bumper disposed at the forward end of the body, and defining a channel that extends transversely across the body relative to the longitudinal axis;
   wherein the bumper includes an upper box portion vertically spaced from and above a lower box portion, and a wall portion extending vertically between the upper box portion and the lower box portion, and wherein the upper box portion, the lower box portion, and the wall portion cooperate to define the channel therebetween; and
   a heat exchanger disposed within the channel of the bumper and operable to transfer heat from a fluid circulating through the heat exchanger to a flow of air passing across the heat exchanger.

2. The vehicle set forth in claim 1 wherein the heat exchanger includes an elongated shape.

3. The vehicle set forth in claim 1 wherein the channel is open toward the forward end of the body.

4. The vehicle set forth in claim 3 wherein the wall portion of the bumper is disposed rearward of the heat exchanger, and defines at least one aperture to allow airflow through the channel.

5. The vehicle set forth in claim 4 wherein the at least one aperture is disposed directly rearward of the heat exchanger.

6. The vehicle set forth in claim 1 further comprising an inlet fluid line in fluid communication with the heat exchanger for circulating the fluid to the heat exchanger, and an outlet fluid line in fluid communication with the heat exchanger for circulating the fluid away from the heat exchanger.

7. The vehicle set forth in claim 6 further comprising a first flexible line connecting the heat exchanger and the inlet fluid line.

8. The vehicle set forth in claim 7 further comprising a second flexible line connecting the heat exchanger and the outlet fluid line.

9. The vehicle set forth in claim 6 wherein the wall portion of the bumper defines a first port for routing the inlet fluid line therethrough, and a second port for routing the outlet fluid line therethrough.

10. The vehicle set forth in claim 1 wherein the wall portion includes a reinforcing member.

11. The vehicle set forth in claim 1 wherein at least one of the upper box portion and the lower box portion include a reinforcing member.

12. A front bumper assembly for a vehicle, the front bumper assembly comprising:
- a structure extending along a structure axis, the structure including an upper box portion vertically spaced from and above a lower box portion, and a wall portion extending vertically between the upper box portion and the lower box portion;
- wherein the upper box portion, the lower box portion, and the wall portion cooperate to define a channel therebetween, which extends along the structure axis; and
- a heat exchanger supported by the structure, and disposed within the channel of the structure;
- wherein the heat exchanger is operable to transfer heat from a fluid circulating through the heat exchanger to a flow of air passing across the heat exchanger.

13. The front bumper assembly set forth in claim 12 wherein the heat exchanger includes an elongated shape that extends along the structure axis.

14. The front bumper assembly set forth in claim 12 wherein the wall portion of the bumper defines at least one aperture to allow airflow through the channel.

15. The front bumper assembly set forth in claim 14 wherein the at least one aperture is disposed adjacent to the heat exchanger.

16. The front bumper assembly set forth in claim 12 wherein the wall portion of the bumper defines a first port for routing a inlet fluid line therethrough, and a second port for routing a outlet fluid line therethrough.

17. The front bumper assembly set forth in claim 12 wherein the wall portion includes a reinforcing member.

18. The front bumper assembly set forth in claim 12 wherein at least one of the upper box portion and the lower box portion includes a reinforcing member.

* * * * *